(12) United States Patent
Nirantar

(10) Patent No.: US 9,830,191 B2
(45) Date of Patent: Nov. 28, 2017

(54) TEMPORARY OR PARTIAL OFFLOADING OF MOBILE APPLICATION FUNCTIONS TO A CLOUD-BASED ENVIRONMENT

(71) Applicant: Seven Networks, Inc., San Carlos, CA (US)

(72) Inventor: Abhay Nirantar, San Jose, CA (US)

(73) Assignee: Seven Networks, LLC, Marshall, TX (US)

(*) Notice: Subject to any disclaimer, the term of this patent is extended or adjusted under 35 U.S.C. 154(b) by 0 days.

(21) Appl. No.: 14/253,740

(22) Filed: Apr. 15, 2014

(65) Prior Publication Data

US 2014/0310709 A1 Oct. 16, 2014

Related U.S. Application Data

(60) Provisional application No. 61/812,149, filed on Apr. 15, 2013.

(51) Int. Cl.
*G06F 9/46* (2006.01)
*G06F 9/50* (2006.01)
*G06F 9/48* (2006.01)

(52) U.S. Cl.
CPC ............ *G06F 9/5027* (2013.01); *G06F 9/485* (2013.01); *G06F 2209/509* (2013.01); *Y02B 60/142* (2013.01); *Y02B 60/144* (2013.01)

(58) Field of Classification Search
None
See application file for complete search history.

(56) References Cited

U.S. PATENT DOCUMENTS 7,337,219 B1   2/2008   Meenan et al.
7,373,661 B2   5/2008   Smith et al.
(Continued)

FOREIGN PATENT DOCUMENTS

KR   2006013477 A   12/2006
KR   20070013369 A   1/2007
(Continued)

OTHER PUBLICATIONS

Satyanarayanan et al, The Case for VM-Based Cloudlets in Mobile Computing, IEEE, 2009, 10 pages.*
(Continued)

*Primary Examiner* — Diem Cao
(74) *Attorney, Agent, or Firm* — NK Patent Law, PLLC

(57) ABSTRACT

Techniques for temporarily and/or partially offloading mobile applications to one or more remote virtual machines in a server include establishing an application copy of a mobile application installed on a mobile device at a remote virtual machine, suspending the mobile application on the mobile device and offloading operations of the mobile application to the application copy at the remote virtual machine for a period of time. Suspending the mobile application and offloading its operations to the remote virtual machine for the period of time reduces consumption of resources on the mobile device. The virtual machine executes the application copy in the same manner the mobile device would execute the mobile application and transfers data from the execution to the mobile application at the end of the period of time to allow the mobile application to update itself and resume its operation without any loss of data or functionality.

21 Claims, 13 Drawing Sheets

(56) References Cited

U.S. PATENT DOCUMENTS

| | | |
|---|---|---|
| 7,383,339 B1 | 6/2008 | Meenan et al. |
| 7,472,424 B2 | 12/2008 | Evans et al. |
| 7,770,223 B2 | 8/2010 | Shevenell et al. |
| 8,074,162 B1 | 12/2011 | Cohen |
| 8,087,085 B2 | 12/2011 | Hu et al. |
| 8,131,763 B2 | 3/2012 | Tuscano et al. |
| 8,761,241 B2* | 6/2014 | Bai ................ H03M 7/30 375/240 |
| 2001/0035799 A1 | 11/2001 | Ueno et al. |
| 2003/0009538 A1 | 1/2003 | Shah et al. |
| 2003/0182420 A1 | 9/2003 | Jones et al. |
| 2003/0191971 A1 | 10/2003 | Klensin et al. |
| 2005/0033657 A1 | 2/2005 | Herrington et al. |
| 2005/0060498 A1 | 3/2005 | Curtis |
| 2006/0277271 A1 | 12/2006 | Morse et al. |
| 2007/0004393 A1 | 1/2007 | Forsberg et al. |
| 2007/0162434 A1 | 7/2007 | Alessi et al. |
| 2007/0201502 A1 | 8/2007 | Abranson |
| 2008/0039032 A1 | 2/2008 | Haumont |
| 2008/0098062 A1 | 4/2008 | Balia |
| 2009/0006116 A1 | 1/2009 | Baker et al. |
| 2009/0249482 A1 | 10/2009 | Sarathy |
| 2010/0070700 A1 | 3/2010 | Borst et al. |
| 2010/0192170 A1 | 7/2010 | Raleigh |
| 2011/0065419 A1 | 3/2011 | Book et al. |
| 2011/0072306 A1 | 3/2011 | Racey et al. |
| 2011/0231469 A1* | 9/2011 | Wolman .............. G06F 9/5094 709/201 |
| 2011/0237222 A1 | 9/2011 | Niejadlik |
| 2011/0320715 A1 | 12/2011 | Ickman et al. |
| 2012/0005276 A1* | 1/2012 | Guo ............... G06F 17/30902 709/206 |
| 2012/0072481 A1* | 3/2012 | Nandlall ............ G06F 9/5027 709/203 |
| 2012/0078997 A1* | 3/2012 | Evans ................ G06Q 10/00 709/203 |
| 2012/0124196 A1 | 5/2012 | Brisebois et al. |
| 2012/0221652 A1 | 8/2012 | Sainio et al. |
| 2012/0272231 A1 | 10/2012 | Kwon et al. |
| 2012/0278431 A1* | 11/2012 | Luna ................. G06F 9/5027 709/217 |
| 2013/0095814 A1* | 4/2013 | Mottes .............. G06F 9/461 455/420 |
| 2013/0122821 A1 | 5/2013 | Yeung |
| 2013/0151652 A1 | 6/2013 | Brech |
| 2013/0163431 A1 | 6/2013 | Backholm et al. |
| 2014/0101237 A1* | 4/2014 | Chan ............. G06F 17/30085 709/203 |

FOREIGN PATENT DOCUMENTS

| | | |
|---|---|---|
| WO | 2004004293 A1 | 1/2004 |
| WO | 2012128792 A1 | 9/2012 |

OTHER PUBLICATIONS

Final Office Action dated Apr. 22, 2015 for application No. 13560092.
Non-Final Office Action dated May 8, 2015 for application No. 14512386.
IPRP for Application No. PCT/US2014/034240 dated Sep. 26, 2014.
Final Office Action dated Apr. 30, 2015 for application No. 14468259.
Non-final Office Action for U.S. Appl. No. 13/560,902 dated Jul. 27, 2012.
USPTO non-Final Office Action dated Oct. 19, 2015 for U.S. Appl. No. 14/468,259.
USPTO, Final Rejection for U.S. Appl. No. 13/457,335, dated Dec. 11, 2015.
WIPO, International Preliminary Report on Patentability for PCT Patent Application PCT/US2014/034240, dated Oct. 20, 2015.
USPTO, Final Rejection for U.S. Appl. No. 14/468,259, dated May 2, 2016.
USPTO, Final Rejection for U.S. Appl. No. 14/468,032, dated May 26, 2016.

\* cited by examiner

TEMPORARY OR PARTIAL OFFLOADING OF MOBILE APPLICATION FUNCTIONS TO A CLOUD-BASED ENVIRONMENT

CROSS-REFERENCE TO RELATED APPLICATIONS

This application claims priority to and benefit from U.S. Provisional Patent Application Ser. No. 61/812,149 titled "TEMPORARY OR PARTIAL OFFLOADING OF MOBILE APPLICATION FUNCTIONS TO A CLOUD-BASED ENVIRONMENT" filed on Apr. 15, 2013, which is expressly incorporated by reference herein.

BACKGROUND

A typical mobile device has multiple mobile applications installed on it. Many of these mobile applications connect to the network regularly to fetch updates, advertisements or other data from their application servers and/or upload data to their application servers. Many of these mobile applications, if not closed, continue running in the background and perform these fetching and uploading tasks, even when they are not being used by the user. As a result, these mobile applications can cause the battery of the mobile device to drain much faster than normal. Moreover, these mobile applications with their constant uploading/downloading behavior can also cause unexpected high data usage. These and other negative behaviors of many mobile applications are undesirable.

BRIEF DESCRIPTION OF THE DRAWINGS

The present embodiments are illustrated by way of example and are not intended to be limited by the figures of the accompanying drawings. In the drawings:

FIG. 1I depicts an example diagram illustrating data flows between example client side components in a distributed proxy and cache system.

The same reference numbers and any acronyms identify elements or acts with the same or similar structure or functionality throughout the drawings and specification for ease of understanding and convenience.

DETAILED DESCRIPTION

Figure 1A:
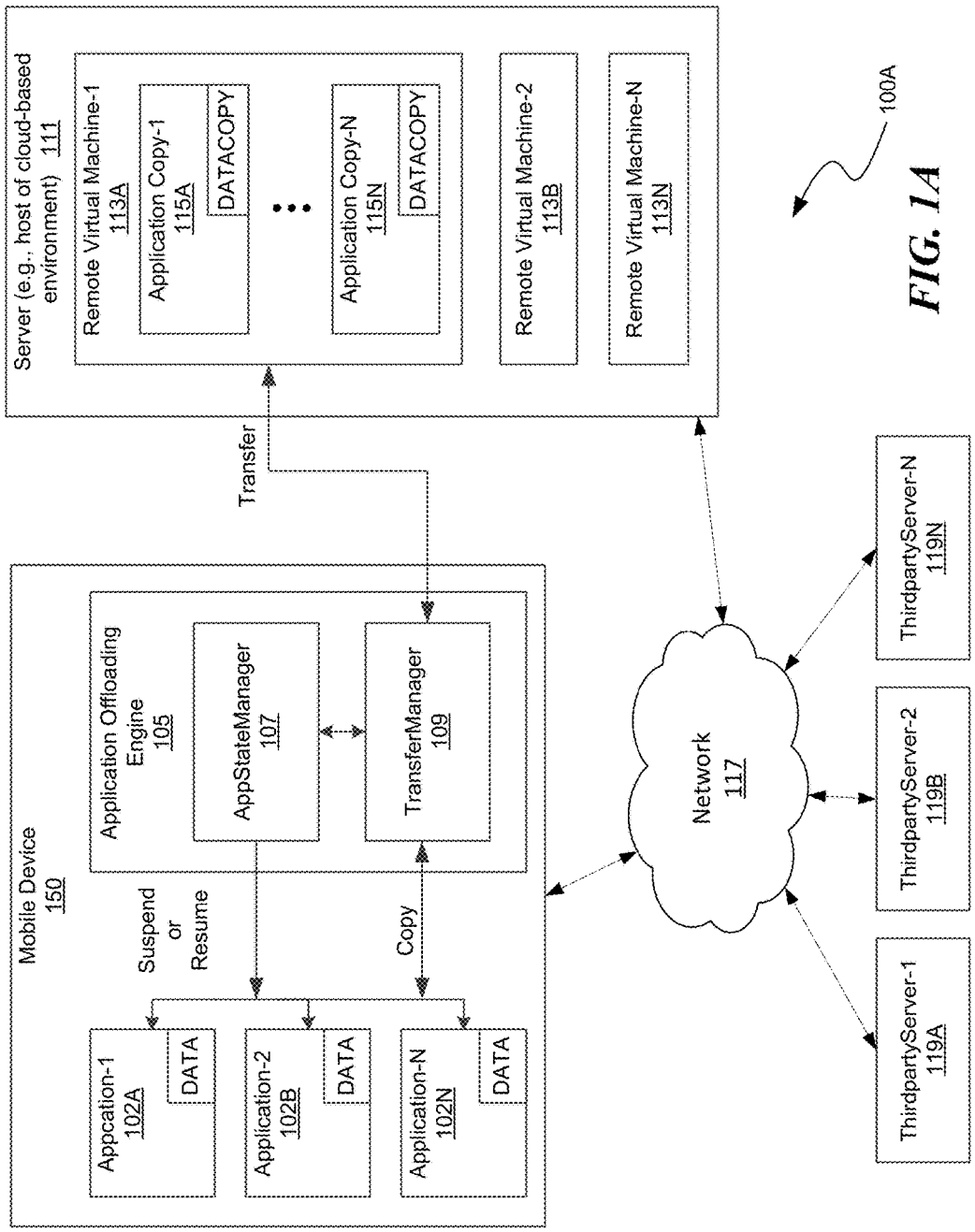
FIG. 1A depicts a diagram illustrating example resources, including an application offload engine and one or more remote virtual machines, that implement the mobile application function and/or operation data offloading techniques disclosed herein.

Techniques are disclosed for offloading mobile applications using one or more remote virtual machines in a server cloud. The disclosed techniques include suspending an application on a mobile device and transferring one or more operation data and/or functions of the suspended application to a remote virtual machine to establish an application copy operating on the remote virtual machine as a surrogate or proxy of the suspended application on the mobile device. The remote virtual machine can be located on a server or a server cloud ("server") that is remote to the mobile device.

Among other advantages, embodiments disclosed herein provide the capability of offloading mobile applications from a user's mobile device to a remote virtual machine that resides in a server cloud during a select time period (e.g., during off-peak or late night hours), thereby reducing power and/or data consumption associated with those mobile application activities which are likely to draw no attention from the user. For example, by offloading operations of one or more mobile applications to one or more remote virtual machines, the resources of the server are used in lieu of the resources of the mobile device. For example, the virtual machines on the server perform the operations such as polling application servers to fetch new or changed content or data instead of the mobile device, and thus, the mobile device consumes less battery resources turning its radio on and off. The configuration data (e.g., data necessary to configure an application copy at the server) and the new or updated data that is transferred between the mobile device and the remote server can be compressed. Moreover, the new or updated data can be transferred in a single operation to the mobile device. These transfer techniques utilize the bandwidth more efficiently. Furthermore, since the virtual machines becomes the first point of communication with the application servers, the virtual machines can screen the new or changed data for malicious or undesirable content and protect the mobile device.

Embodiments of the present disclosure include a system and method of offloading operations of a mobile application. The method can comprise establishing an application copy of a mobile application installed on a mobile device at a remote virtual machine, suspending the mobile application on the mobile device and offloading operations of the mobile application to the application copy at the remote virtual machine for a period of time. In some embodiments, establishing the application copy of the mobile application on the mobile device at the remote virtual machine includes transferring application data associated with the mobile application to the remote virtual machine to facilitate the application copy to be executed on the remote virtual machine in the same manner the mobile application would be executed on the mobile device. In some embodiments, the application copy is executed at the remote virtual machine to perform the operations of the mobile application. Such operations can include communicating with an application server associated with the mobile application to obtain new or changed data. In some embodiments, the received data including new or changed data for updating the mobile application and data that is transferred to the remote virtual machine to establish the application copy are compressed using one or more compression techniques to reduce network bandwidth consumption during the transfer.

The method can further comprise receiving data generated or obtained by the application copy during the period of time the operations of the mobile application was offloaded to the application copy and updating the mobile application with the received data. Upon updating the mobile application with the received data which can include new or changed data, the method can resume the mobile application on the mobile device.

In some embodiments, suspending the mobile application and offloading the operations of the mobile application to the remote virtual machine for the period of time reduces consumption of resources by the mobile application on the mobile device. In some embodiments, offloading the operations of the mobile application to the application copy at the remote virtual machine for the period of time reduces consumption of power, data, memory and/or CPU resources by the mobile application on the mobile device. In some embodiments, multiple mobile applications on the mobile device can have application copies established at a server hosting multiple remote virtual machines including the remote virtual machine.

In some embodiments, the method can further comprise determining the period of time during which the operations of the mobile application are offloaded to the application copy at the remote virtual machine based on at least one of: user instructions, user activity patterns or a state of the mobile application. In some embodiments, the method can include selecting the mobile application from a plurality of mobile applications on the mobile device for offloading based on user instructions. In other embodiments, the method can include tracking resource consumption by a plurality of mobile applications on the mobile device and selecting the mobile application for offloading based on the resource consumption that is tracked.

Embodiments of the present disclosure include a mobile device that is configured to execute the methods of the present disclosure. For example, in some embodiments, a mobile device can transfer configuration data corresponding to a mobile application on the mobile device to a remote server to establish a proxy of the mobile application on a virtual machine hosted by the remote server. The mobile device can suspend the mobile application on the mobile device and offload operations of the mobile application to the proxy of the mobile application at the virtual machine for a period of time. Timing for suspending the mobile application and offloading operations of the mobile application can be determined based on user instructions, availability of resources on the mobile device, state of the mobile application or a combination thereof. The mobile device, in some embodiments, can receive application data corresponding to the operations of the mobile application performed by the proxy of the mobile application from the virtual machine, update the mobile application on the mobile device using the received application data and resume the mobile application following the update.

Embodiments of the present disclosure include a system configured to execute any of the methods disclosed herein. For example, in some embodiments a system comprising a remote server or a server cloud can host a virtual machine. The virtual machine can be configured to receive configuration data to establish a copy of a mobile application installed on a mobile device and in response to receiving instructions, execute the copy of the mobile application for a period of time in the same manner as the mobile device would execute the mobile application. The virtual machine can aggregate new or changed data from executing the copy of the mobile application and at the end of the period of time, transfer the new or changed data that are aggregated to the mobile application on the mobile device. In some embodiments, the period of time is included in the instructions and is determined based on user behavior, user settings or a state of the mobile application.

In some embodiments, the mobile application remains in a paused or suspended state during the period of time to reduce consumption of resources by the mobile application on the mobile device. The new or changed data that is transferred to the mobile application at the end of the period of time can update the mobile application and cause the mobile application exit the paused state and resume normal operation. In some embodiments, the virtual machine is one of multiple virtual machines hosted by the remote server or server cloud and the multiple virtual machines are configured to execute copies of mobile applications installed on multiple mobile devices.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1A depicts a diagram 100A illustrating example resources that implement the mobile application offloading techniques disclosed herein. Included in the diagram 100A is a mobile device 150, a server 111, third-party servers 119A-N, and a communications network 117.

The server 111 may be a host server that facilitates management of traffic, content caching, and/or resource conservation (e.g., the host server 100, described in FIG. 1B below) or another server 111 that is fully or partially, physically or functionally, separate from the host server 100. Depending on the embodiments, this separate server 111 and/or the functions performed thereby may be a portion of the host server 100, or it may be hosted by a third party (e.g., any of the third-party servers 119A-N).

As an additional or an alternative embodiment, any one of the third-party servers 119A-N comprises the server 111. In one of such embodiments, a respective third-party server (e.g., third-party server 119A) may host a remote virtual machine for a corresponding application (e.g., application 102A) on a mobile device (e.g., mobile device 150). For example, the third-party server 119A can include a mobile application hosting server which provides the interactions and/or functions for the corresponding application 102A, which is accessed via or at the mobile and/or other devices coupled to the network 117. The third-party server 119A can function as the server 111 and host virtual machines for one or more mobile devices in performing the application function and/or operation data offloading techniques discussed herein.

Applications 102A-N are example applications of the mobile device 150. Applications 102A-N accessed on or via the mobile device 150 can communicate directly with the third-party servers 119A-N via the network 117. Some examples of applications 102A-N include news applications, weather services, email clients, gaming applications, productivity applications, feeds, mapping applications, readers, entertainment applications, multimedia applications, and/or social network applications. In general, mobile applications 102A-N have content and data relevant or necessary to the operations of the application. These applications 102A-N routinely communicate with the third-party servers 119A-N (e.g., via polling techniques) for any update, and receive the updates and/or content via the network 117, using radio communication modules (not shown in FIG. 1A).

The embodiments disclosed herein recognize that, as the computing and storage resources on mobile devices become more powerful than ever, so are the power and data consumption associated with generating and communicating these data. Indeed, there is an increased multitude of applications running on mobile devices such as mobile device 150, and each application consumes more and more resources including, for example, central processing unit(s), memory space, battery power, network bandwidth, and so on. From a practical standpoint, many data subscription services purchased by users of mobile devices also charge their fees (sometimes exponentially) by the amount of data used, and therefore a reduction in unnecessary data consumption is desirable.

According to the embodiments provided herein, the mobile device 150 can offload mobile application function and/or operation data to a server (e.g., server 111, a third-party server 119A-N), which can reduce unnecessary power and/or data consumption on the mobile device 150 while maintaining functionalities and/or operations of the application. In some embodiments, the server 111 can host a cloud-based environment and can include, for example, remote virtual machines (RVM) 113A-N.

In some embodiments, the mobile device 150 includes an application offload engine (AOE) 105 that can transfer functioning and/or operation data of the applications 102A-N to a corresponding RVM 113A-N that corresponds to the mobile device 150. The transfer can occur for one or more time periods that are determined (e.g., by an application state manager 107) as appropriate or desirable. When the transfer is initiated, the application offload engine can suspend, pause, or otherwise fully or partially stop the functioning of the application on the mobile device 150. The functions and/or operation data of each application (e.g., application 102A) on mobile device 150, after being transferred by application offload engine 105 (e.g., using a transfer manager 109), form a surrogate application copy (e.g., application copy 115A) on the RVM 113A in the cloud environment hosted by the server 111. During the time periods, the application 102A on the mobile device 150 remains dormant or suspended while its surrogate application copy 115A on the RVM 113A becomes active and continues the application's normal operation from the cloud (e.g., hosted by the server 111), including any functions and/or interactions with the third-party servers (e.g., third-party server 119A).

When the time period ends, application data generated through operation of the application copy 115A during the time period can be in part or in whole sent back to the mobile device 150. The application offload engine 105 can update the suspended application 102A according to data that are transferred back. Thereafter, the application offload engine 105 can resume the application 102A on the mobile device. By offloading mobile applications from the mobile device 150 to the server 111 during those time periods, for example, which draw no attention from the user, or otherwise is not in use or is inactive or in the background, the application offload engine 105 and the RVM can reduce power and/or data consumption associated with mobile application activities while maintaining the application's normal operations.

In addition to or as an alternative to transferring the functions of the application 102A, some embodiments of the application offload engine 105 can transfer a duplicate software copy of the application 102A to the RVM 113A. In some other embodiments, only updates or changes to the application data is transferred back. These and various other embodiments and implementations of the disclosed offloading techniques are described in more details below.

Figure 1B:
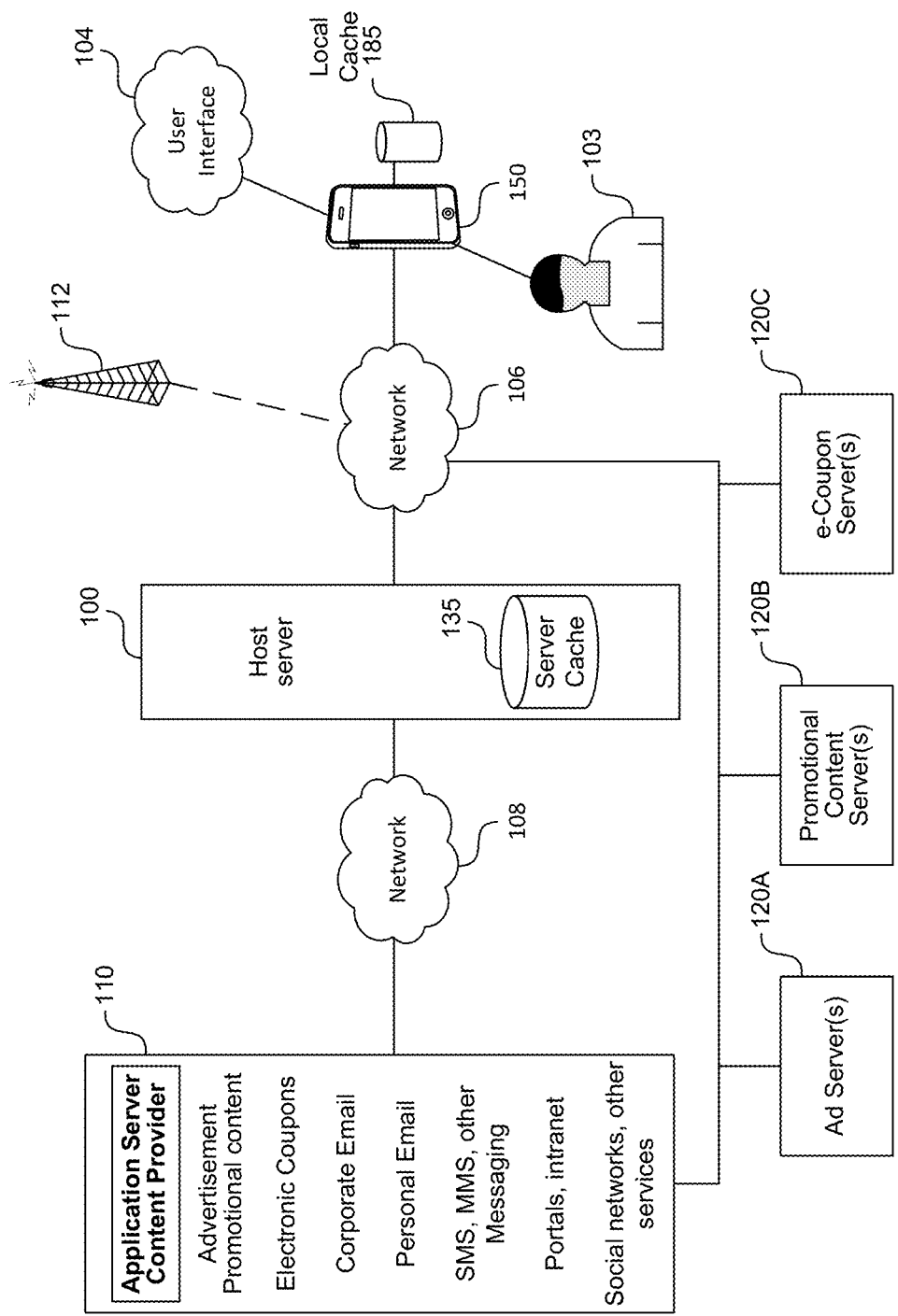
FIG. 1B depicts an example diagram of a system where a host server facilitates management of traffic, content caching, and/or resource conservation, and/or mobile application offloading.

FIG. 1B illustrates an example diagram of a system where a host server 100 facilitates management of traffic, content caching, and/or resource conservation and/or mobile application offloading between mobile devices (e.g., wireless devices 150), and an application server or content provider 110, or other servers such as an ad server 120A, promotional content server 120B, or an e-coupon server 120C in a wireless network (or broadband network) for resource conservation. The host server 100 can further interact with mobile or client devices 150 for getting reports and/or updates on resource usage, savings, and the like.

The client devices 150 can be any system and/or device, and/or any combination of devices/systems that is able to establish a connection, including wired, wireless, cellular connections with another device, a server and/or other systems such as host server 100 and/or application server/content provider 110. Client devices 150 typically include a display and/or other output functionalities to present information and data exchanged between among the mobile devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, a handheld tablet (e.g., an iPad or any other tablet), a hand held console, a hand held gaming device or console, any SuperPhone such as the iPhone, and/or any other portable, mobile, hand held devices, or fixed wireless interface such as a M2M device, etc. In one embodiment, the client devices 150, host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data and/or mobile application loading and/or activities. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of mobile device 150 side resources (e.g., including but not limited to battery power consumption, radio use, processor/memory use) are optimized with a general philosophy for resource conservation while still optimizing performance and user experience.

For example, in context of battery conservation, the mobile device 150 can observe user activity (for example, by observing user keystrokes, backlight status, or other signals via one or more input mechanisms, etc.) and alters device 150 behaviors. The mobile device 150 can also request the host server 100 to alter the behavior for network resource consumption based on user activity or behavior.

In one embodiment, the traffic management for resource conservation and/or mobile application offloading are performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management and/or mobile application offloading for resource conservation in networks (e.g., network 106 and/or 108) and devices 150, can reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C. Notably, in some embodiments of such systems, the host server 100 can include the server 111 (FIG. 1A), the application server 110 can include the third-party servers (e.g., third-party server 119A in FIG. 1A), and/or the mobile device 150 can include the mobile device 150 (FIG. 1A).

In one embodiment, client devices 150 communicate with the host server 100 and/or the application server 110 over network 106, which can be a cellular network and/or a broadband network. To facilitate overall traffic management and/or mobile application offloading between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
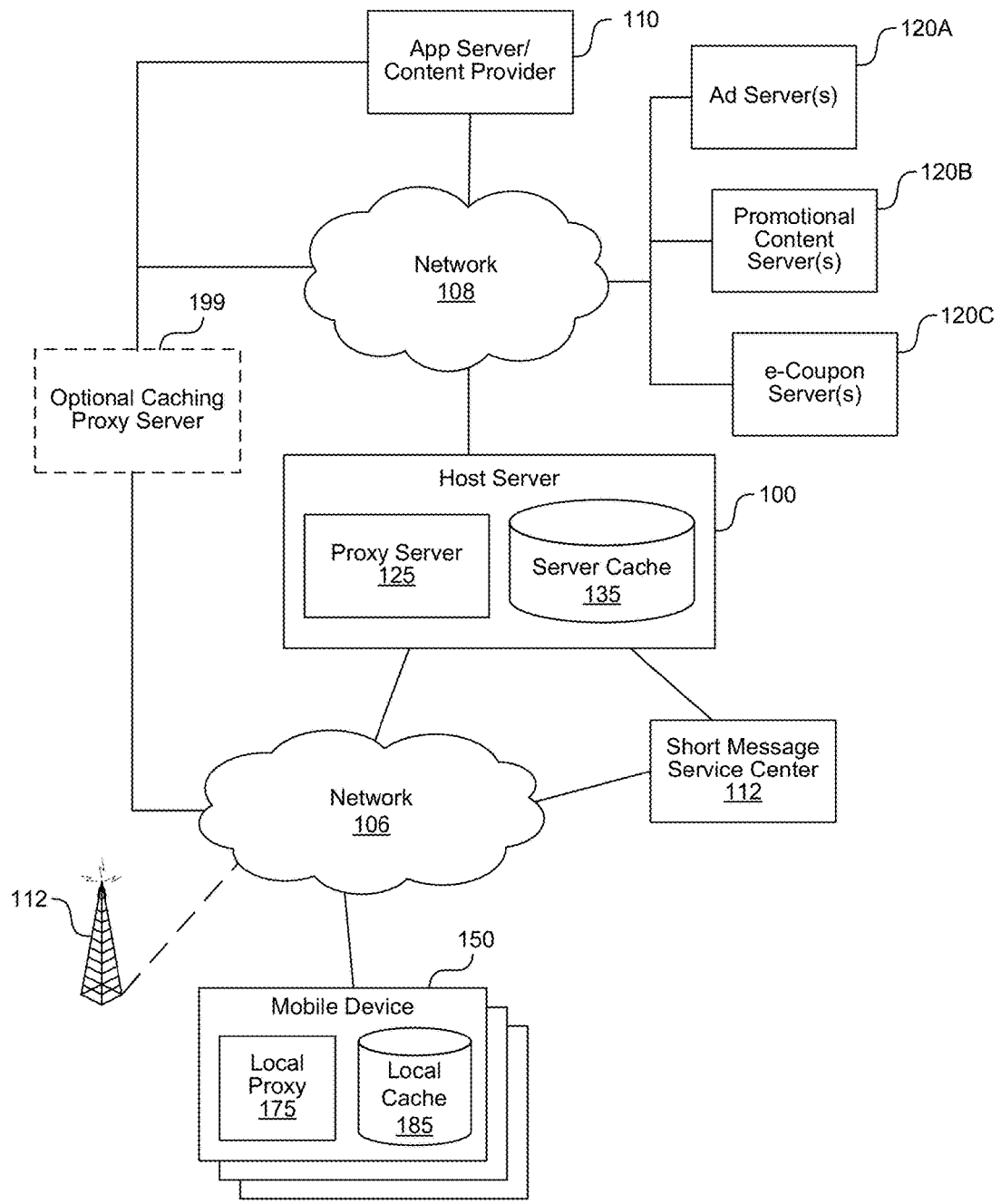
FIG. 1C depicts an example diagram of a proxy and cache system distributed between the host server and device which facilitates network traffic management and/or mobile application offloading.

FIG. 1C illustrates an example diagram of a proxy and cache system distributed between the host server 100 and mobile device 150 which facilitates network traffic management and/or mobile application offloading between the mobile device 150 and an application server or content provider 110, or other servers such as an ad server 120A, promotional content server 120B, or an e-coupon server 120C for resource conservation and content caching. The proxy system distributed among the host server 100 and the mobile device 150 can further track alarms, timers or other triggers implemented by applications on a device and resources used by such alarms, timers, or other triggers to determine associations using which the proxy system can manipulate the alarms, timers or other triggers to occur at an optimal time to reduce resource usage.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the mobile device 150 (e.g., a mobile device).

In addition, the client-side proxy 175 and local cache 185 can be partially or wholly external to the mobile device 150 and in communication via one or more of the networks 106 and 108. For example, the local proxy 175 may be external to the mobile device 150 and the local cache 185 may be maintained at the mobile device 150. Alternatively, the local proxy 175 may be within the mobile device 150 while the local cache 185 is external to the mobile device 150. In addition, each of the client-side proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the mobile device 150, for example, from one or more of, the application server/provider 110, host server 100, and/or a network service provider 112. Content caching can also be entirely or partially performed by the remote proxy 125 to satisfy application requests or other data requests at the mobile device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the mobile device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the mobile device 150 in achieving network traffic management. Note that 112 can also utilize any other type of alternative channel including USSD or other network control mechanisms. The host server 100 can forward content or HTTP responses to the SMSC 112 such that it is automatically forwarded to the mobile device 150 if available, and for subsequent forwarding if the mobile device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 1D:
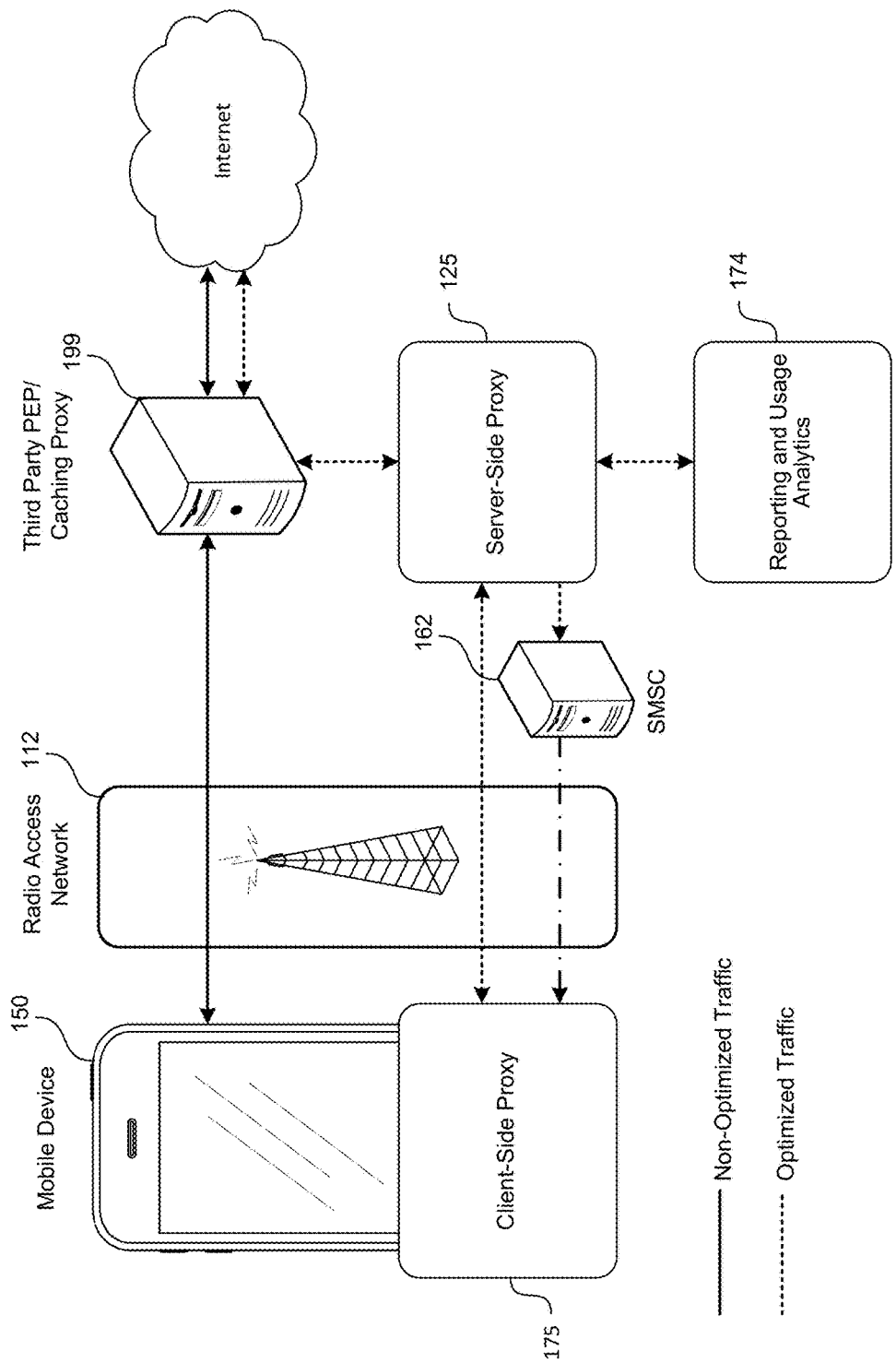
FIG. 1D depicts an example diagram of the logical architecture of a distributed proxy and cache system.

FIG. 1D illustrates an example diagram of the logical architecture of a distributed proxy and cache system.

The distributed system can include, for example the following components:

client-side proxy 175: a component installed in the Smartphone, mobile device or wireless device 150 that interfaces with device's operating system, as well as with data services and applications installed in the device. The client-side proxy 175 is typically compliant with and able to operate with standard or state of the art networking protocols.

The server-side proxy 125 can include one or more servers that can interface with third party application servers (e.g., 199), mobile operator's network (which can be proxy 199 or an additional server that is not illustrated) and/or the client-side proxy 175. In general, the server-side proxy 125 can be compliant with and is generally able to operate with standard or state of the art networking protocols and/or specifications for interacting with mobile network elements and/or third party servers.

Reporting and Usage Analytics Server 174: The Reporting and Usage Analytics system or component 174 can collect information from the client side 175 and/or the server side 125 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 125, or it may be a component of the server-side proxy 125, residing partially or wholly therein.

Figure 1E:
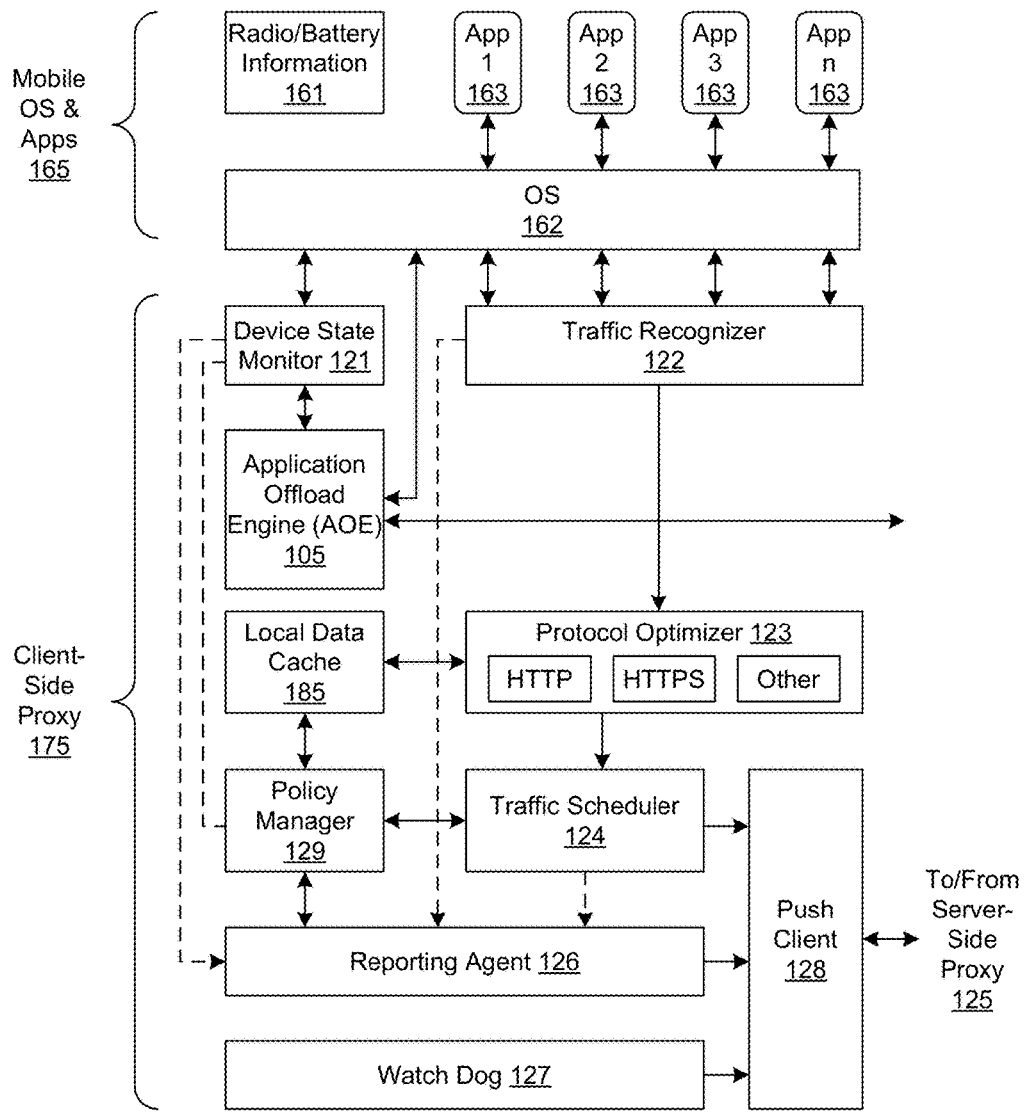
FIG. 1E depicts an example diagram showing the architecture of client side components in a distributed proxy and cache system with an application offload engine implemented on the client-side proxy in accordance with some embodiments.

FIG. 1E illustrates an example diagram showing the architecture of client side components in a distributed proxy and cache system.

The client side components of the client-side proxy 175 can include software components or agents installed on the mobile device that enables traffic optimization and performs the related functionalities on the client side. Components of the client-side proxy 175 can operate transparently for end users and applications 163. The client-side proxy 175 can be installed on mobile devices for optimization to take place, and it can effectuate changes on the data routes. Once data routing is modified, the client-side proxy 175 can respond to application requests to service providers or host servers, in addition to or instead of letting those applications 163 access data network directly. In general, applications 163 on the mobile device do not notice that the client-side proxy 175 is responding to their requests. Some example components of the client-side proxy 175 are described as follows:

Device State Monitor 121: The device state monitor 121 can be responsible for identifying several states and metrics in the device, such as network status, display status, battery level, etc. such that the remaining components in the client-side proxy 175 can operate and make decisions according to device state, acting in an optimal way in each state.

Application Offload Engine (AOE) 105: As described in relation to FIG. 1A, the application offload engine 105 can perform, in conjunction with a Remote Virtual Machine (RVM) 179 (FIG. 1F, discussed below), the mobile application offloading techniques disclosed herein. In the embodiment shown in FIG. 1E, the application offload engine 105 is coupled to the device state monitor 121 to receive application activity, battery, network status, as well as user selection, an administrator's selection, and/or other suitable information in determining time periods for performing the mobile application offloading. The AOE 105 can also communicate with the server-side proxy 125 (FIG. 1F) for transferring the functionalities and/or operation data of applications 163 (e.g., applications 102, FIG. 1A) to and from the server 111.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client-side proxy 175. While analyzing traffic, the client-side proxy 175 can identify recurring polling patterns which can be candidates to be performed remotely by the server-side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 129: The policy manager 129 can store and enforce traffic optimization and reporting policies provisioned by a Policy Management Server (PMS). At the client-side proxy 175 first start, traffic optimization and reporting policies (policy profiles) that is to be enforced in a particular device can be provisioned by the Policy Management Server.

Watch Dog 127: The watch dog 127 can monitor the client-side proxy 175 operating availability. In case the client-side proxy 175 is not working due to a failure or because it has been disabled, the watchdog 127 can reset DNS routing rules information and can restore original DNS settings for the device to continue working until the client-side proxy 175 service is restored.

Reporting Agent 126: The reporting agent 126 can gather information about the events taking place in the device and sends the information to the Reporting Server. Event details are stored temporarily in the device and transferred to reporting server only when the data channel state is active. If the client-side proxy 175 doesn't send records within twenty-four hours, the reporting agent 126 may attempt to open the connection and send recorded entries or, in case there are no entries in storage, an empty reporting packet. All reporting settings are configured in the policy management server.

Push Client 128: The push client 128 can be responsible for the traffic to between the server-side proxy 125 and the client-side proxy 175. The push client 128 can send out service requests like content update requests and policy update requests, and receives updates to those requests from the server-side proxy 125. In addition, push client 128 can send data to a reporting server (e.g., the reporting and/or usage analytics system which may be internal to or external to the server-side proxy 125).

The proxy server 199 has a wide variety of uses, from speeding up a web server by caching repeated requests, to caching web, DNS and other network lookups for a group of clients sharing network resources. The proxy server 199 is optional. The distributed proxy and cache system (e.g., the server-side proxy 125 and/or the client-side proxy 175) allows for a flexible proxy configuration using either the proxy 199, additional proxy(s) in operator's network, or integrating both proxies 199 and an operator's or other third-party's proxy.

Figure 1F:
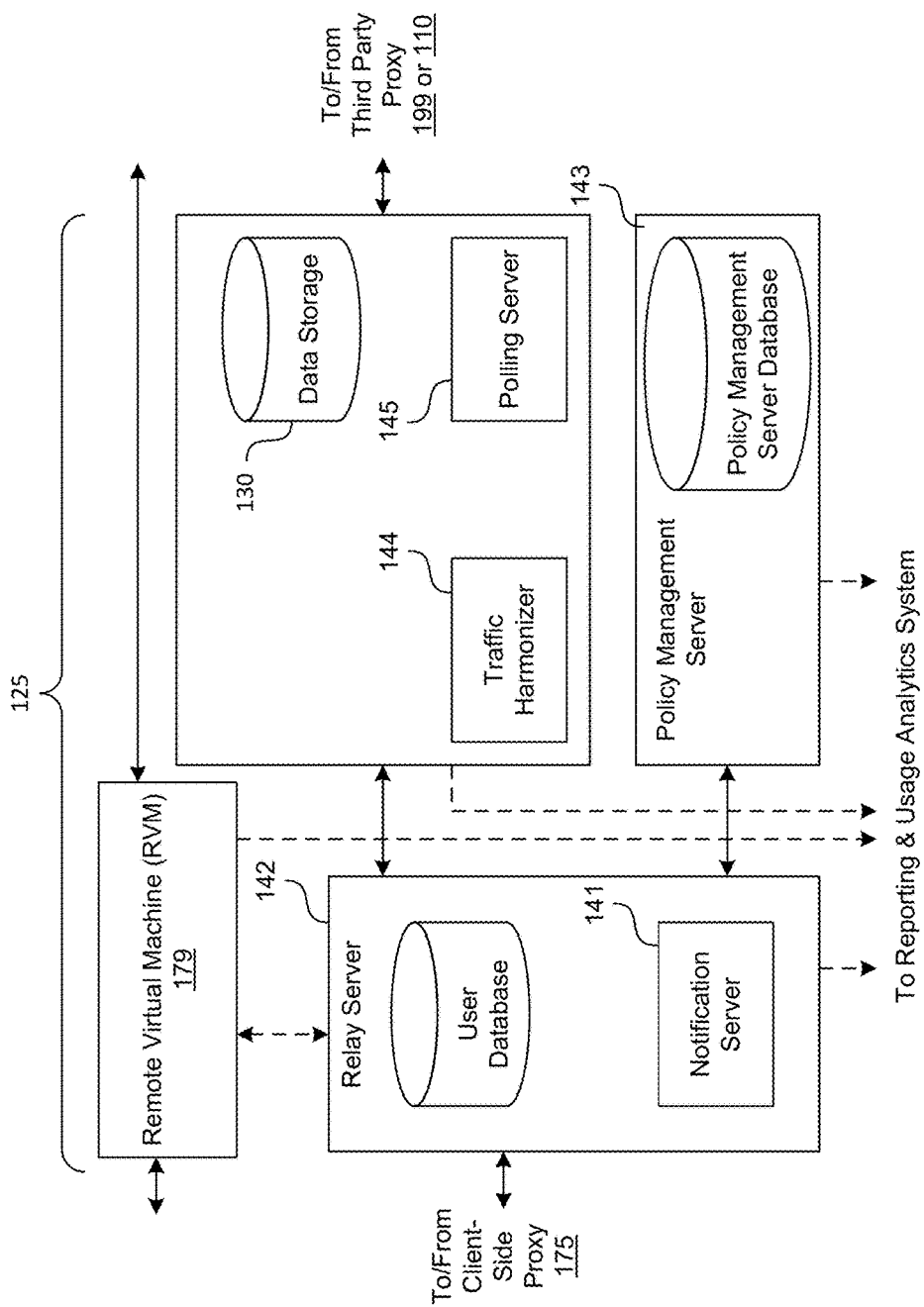
FIG. 1F depicts an example diagram of the example components on the server side of the distributed proxy and cache system with a remote virtual machine implemented on the server-side proxy in accordance with some embodiments.

FIG. 1F illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client-side proxy 175, or other third party (e.g., application server/service provider 110 and/or other proxy 199) and/or a reporting and usage analytics system. Some example components of the server-side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Remote Virtual Machine (RVM) 179: Similar to what are mentioned with regard to FIG. 1A, the RVM 179 can perform, in conjunction with Application Offload Engine (AOE) 177 (FIG. 1E), the mobile application offloading techniques disclosed herein. In some embodiments, such as the one shown in FIG. 1F, the RVM 179 is coupled to the relay server 142 to receive relevant connection and communication information for performing the mobile application offloading. The surrogate application copies which reside and operate in the RVM 179 during the offloading time periods can communicate to third-party servers or proxies via the RVM 179 (e.g., through network connections, or through third-party proxy 199 or 110) in carrying out normal operations in substitution of the applications 102 or 163 on the client device 150.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 125, and provides the tools for producing reports and usage analytics that operators can use for analyzing application signaling and data consumption.

Most mobile applications regularly poll their application servers to check for new data. Often there is no new data or the content has not changed, so the exchange of data through the mobile network is unnecessary. As the number of mobile phones and their applications increase, the amount of this needless polling grows. Since applications are not coordinated and poll at different times and intervals, any given phone may frequently generate signal traffic. This causes multiple unnecessary radio activations, consuming power and shortening battery life.

In one embodiment, the signaling optimizer reduces network requests to a minimum by caching content in the client and letting its own server poll for changes in the network. When a mobile phone's client side proxy (e.g., local proxy) 175 detects a recurring pattern for a resource, such as an email application, its response content is stored locally in a client cache so similar requests from that application get their response from the local cache, rather than signaling the network.

Figure 1G:
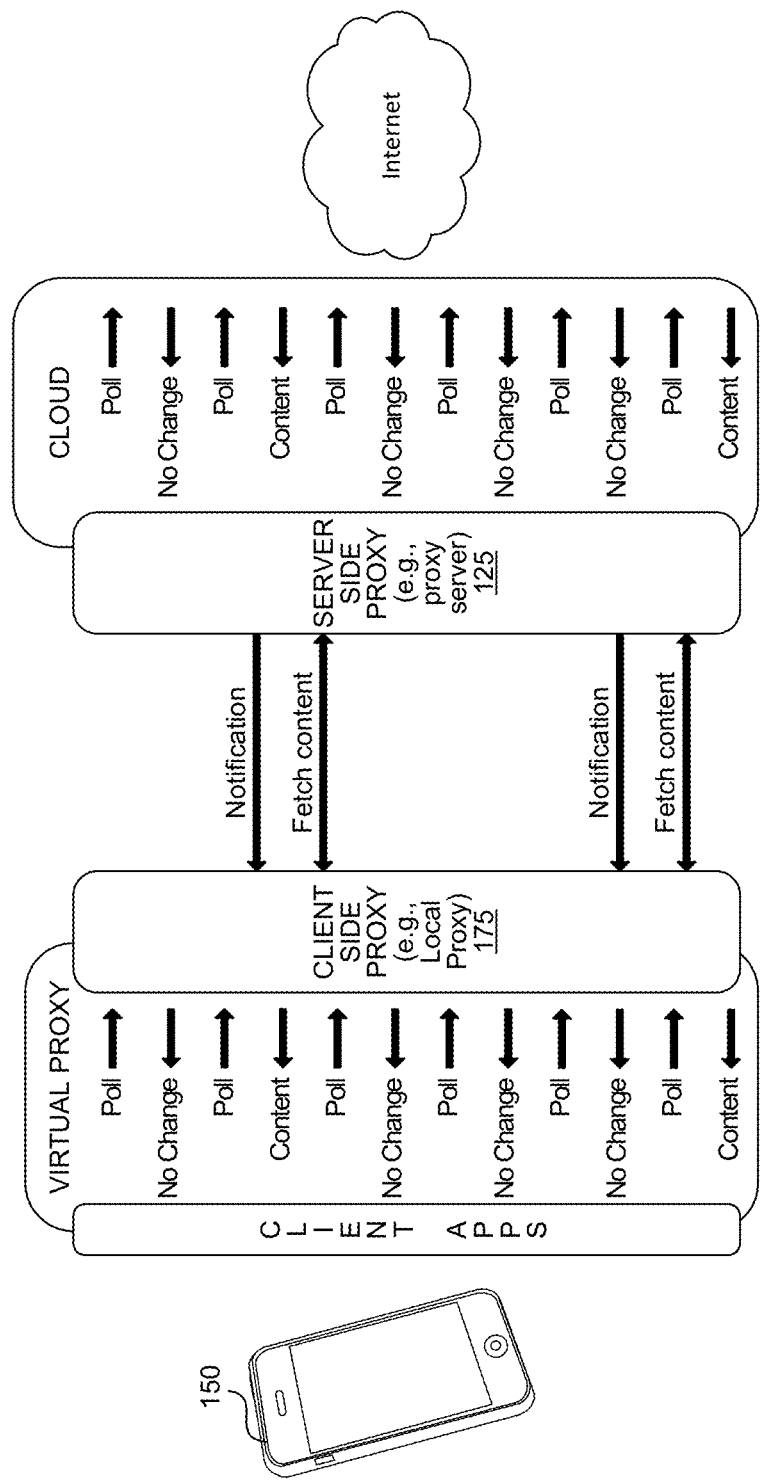
FIG. 1G depicts an example diagram of a signaling optimizer of the distributed proxy and cache system.

FIG. 1G illustrates an example diagram of a signaling optimizer of the distributed proxy and cache system.

As an example, someone who typically gets only 10 emails a day may have phone's email application poll the network for new email every 15 minutes, or 96 times a day, with around 90% or more of the polls resulting in the same response: there are no new emails. The client side proxy (e.g., local proxy) 175 can recognize this request—response pattern, and intercepts the application's poll requests, returning the locally cached response of "no new emails". This way the device radio is not turned on by this particular application, and the poll doesn't use any network resources. The server (e.g., host server 100, proxy server 125), located in the network, can monitor the email application server on behalf of the user's email application. When new email is available, the server can notify the user's client-side proxy 175 to not use the cached "no new emails" response for the next poll request. Instead of going to the local client cache, the email application polls its application server over the network and receives the new content.

The signaling optimizer can be configured and managed using different rule sets for different device types, user types, wireless networks, and applications. Optimization rules can be updated at any time, so the changes can be applied immediately when an application upgrades or changes happen in the mobile network. The protocols that can be optimized include, but are not limited to: HTTP, HTTPS and DNS.

Figure 1H:
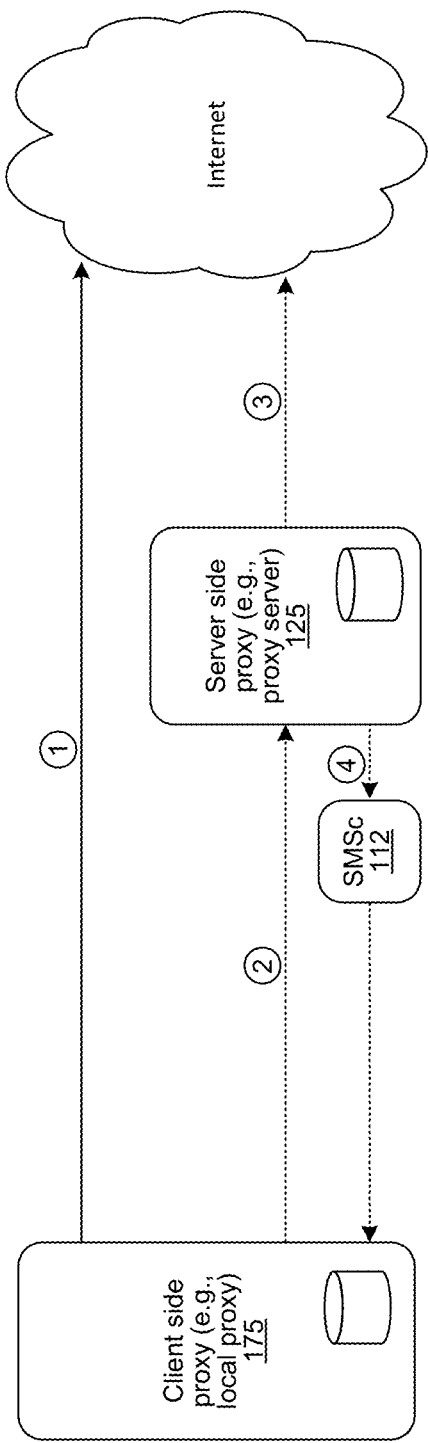
FIG. 1H depicts an example diagram of an example client-server architecture of the distributed proxy and cache system.
Figure 11:
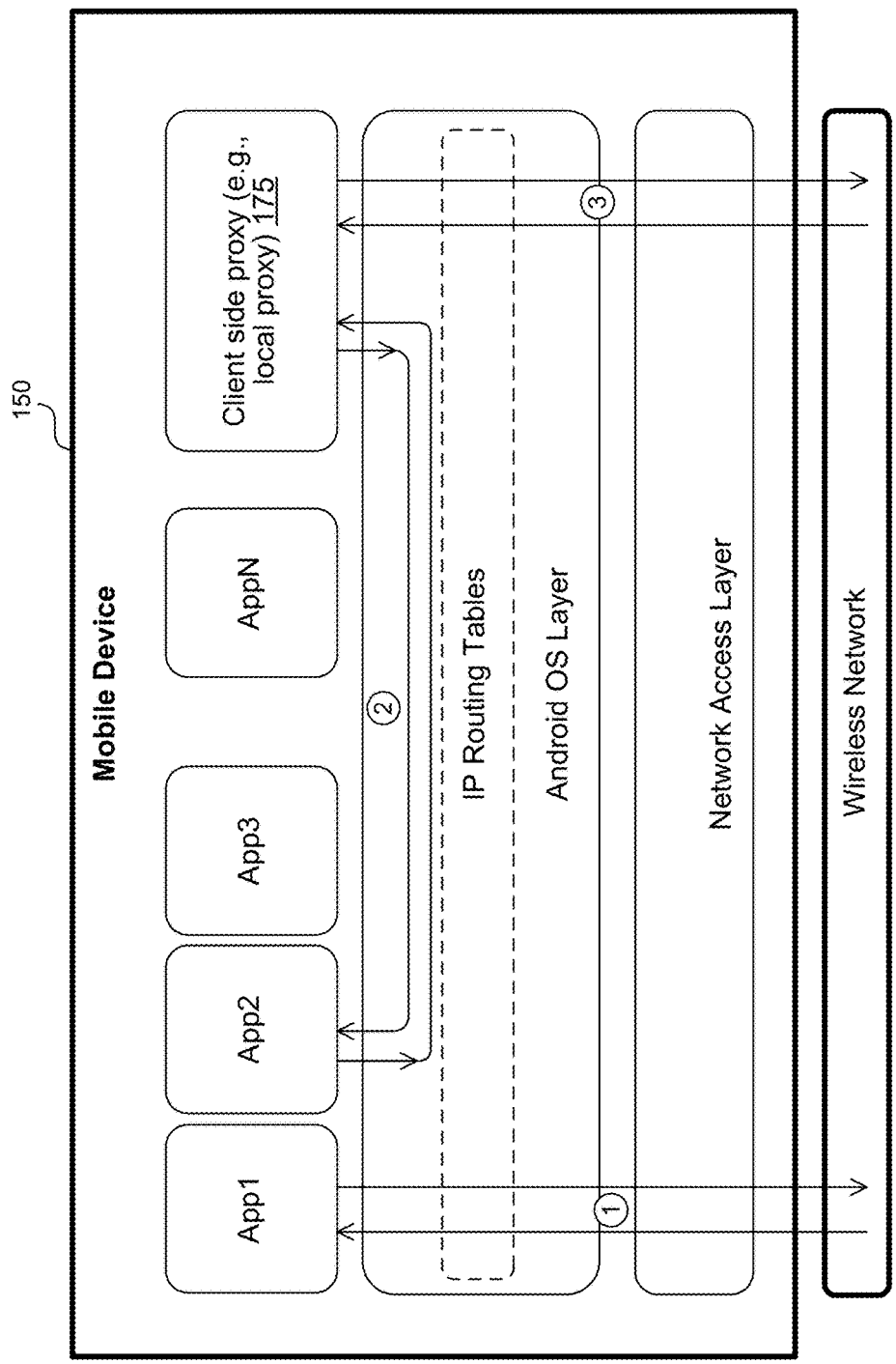

FIG. 1H illustrates an example diagram of an example client-server architecture of the distributed proxy and cache system.

In the client-server architecture, the client-side proxy 175 (e.g., local proxy) is residing on the mobile or client devices. The client-side proxy 175 can communicate both directly to the Internet (usually via an operator proxy) and to the server side proxy (e.g., proxy server) 125, or the host server 100. The proxy server 125 communicates to the Internet and to the operator's SMSC 112.

As depicted, the client-side proxy 175 can send a request directly to the Internet. This can happen after requests have been analyzed to detect optimizable patterns, for example. The client-side proxy 175 can, in one implementation, send a request to the server (e.g., host server 100, proxy server 125), for example, to initiate server polling, to reports logs or to get new configuration. The proxy server 125 can send a request to the Internet to, for example, validate cached content. In one implementation, the proxy server 125 can send a request to the SMSC 112, for example, to send a cache invalidate message or policy update message to the client-side proxy 175.

In one implementation, the client-side proxy 175 may not maintain an open connection with the proxy server 125, but may connect to the proxy server 125 only in case there's a need to start polling an origin server 110, to report logs or to get new configuration. For signaling optimizer feature, the proxy server 125 can notify the client-side proxy 175 when the content, that has been polled, has changed. The proxy server 125 can send a request to invalidate cache in the client-side proxy 175. When the application connects to that particular origin server (e.g., content server 110) the next time, it can first fetch the latest content from the proxy server 125 and then directly connect to the origin server 110. For the policy enforcer and/or the network protector features, the proxy server 125 can notify the client-side proxy 175 when there's new configuration to be fetched from the server. When the proxy server 125 needs to communicate with the client-side proxy 175, it can use a connection that is already open for some other request. If the connection is not open, the proxy server 125 can send a notification (e.g., SMS) to the client-side proxy 175.

FIG. 1I depicts an example diagram illustrating data flows between example client side components in a distributed proxy and cache system. Traffic from applications (e.g., App1, App2, App3 to AppN), client side proxy (e.g., local proxy) 175, IP Routing Tables (e.g., in the Android Operating System Layer), Network Access Layer and Wireless Network are depicted.

In one implementation, non-optimized application traffic flow, such as traffic from App1, can completely bypass the client-side proxy 175 components and proceed directly through the operating system layer (e.g., the Android OS layer) and Network Access Layer to the wireless network. Traffic that that is not optimized can include, but is not limited to: rich media, like video and audio, as well as traffic from networks and applications that has been configured to bypass optimization and traffic pending optimization, and the like. In one embodiment, all traffic can be configured to bypass the client side/server side proxy.

In another implementation, optimized application traffic, such as traffic from App2, can be redirected from the application to the client-side proxy 175. By default, this can be traffic on ports 80 (HTTP) and 53 (DNS), and selected traffic on port 443 (HTTPS), for example. However, traffic to other ports can be configured to be directed to the client side proxy.

In yet another implementation, traffic flow can be between the client-side proxy 175 and the origin servers (e.g., content server 110) via the Internet and/or between the client-side proxy 175 and the server side proxy (e.g., proxy server) 125.

Figure 2:
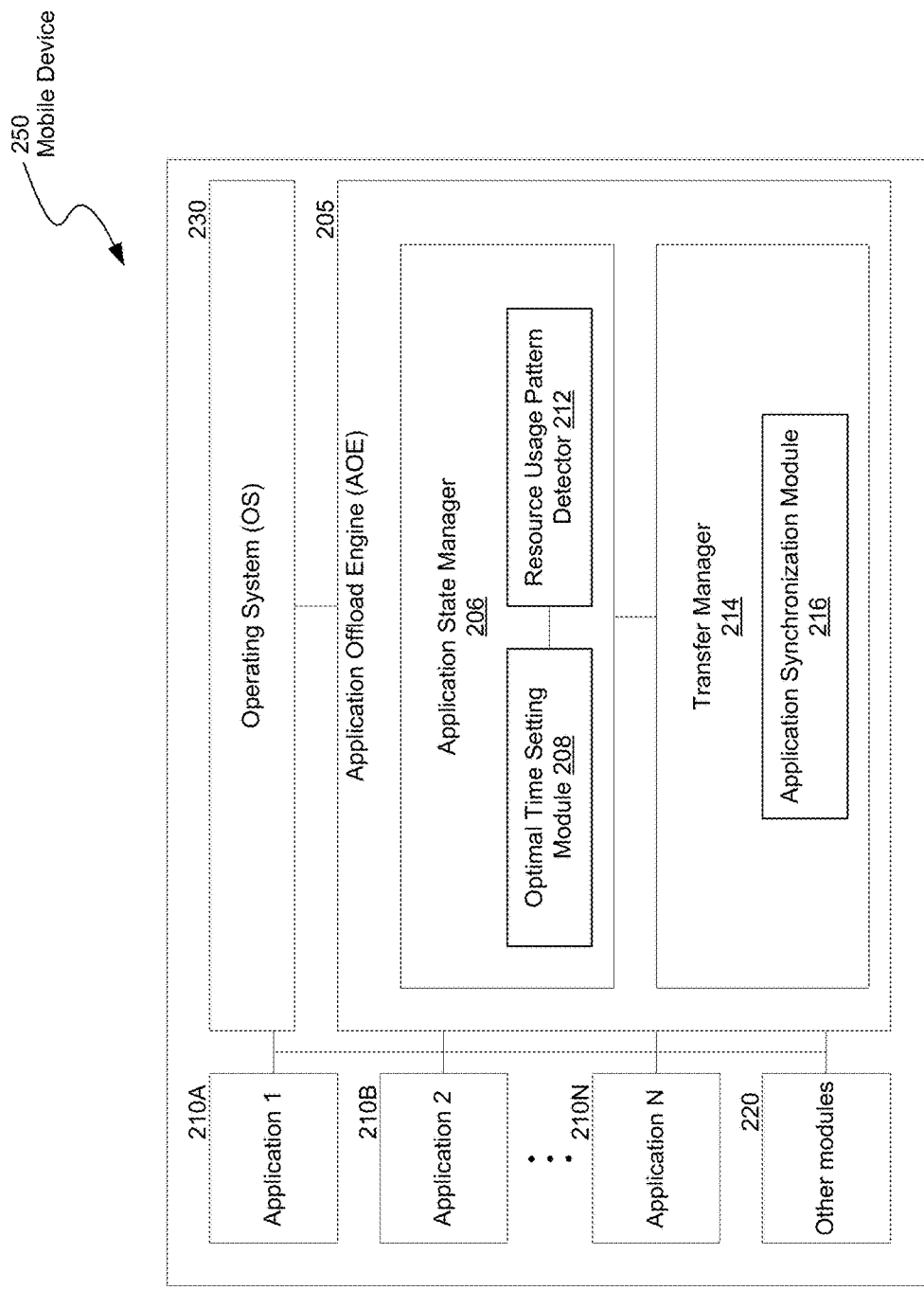
FIG. 2 depicts example functional components of a mobile device implementing the application function and/or operation data offloading engine.

FIG. 2 depicts example functional components of a mobile device 250 implementing an application offloading engine2.

The mobile device 250 can include one or more applications 210A-210N, an operating system (OS) 230, other platform specific and/or other modules 220 such as network interface components, sensor components, native applications, etc., other components described in FIG. 1E, and the like. The application offload engine 205, in some embodiments, can include an application state manager 206 (e.g., application state manager 107 of FIG. 1A) and a transfer manager 214 (e.g., transfer manager 109 of FIG. 1A). In some embodiments, the application state manager 206 can include an optimal time setting module 208 and the transfer manager 214 can include an application synchronization module 216. Additional or less modules or components can be included in the application offload engine 205. Depending on the implementation, one or more of the components can be consolidated into a single component, and/or a single component can be further divided into multiple components.

According to some embodiments, the application offload engine 205 can perform mobile application offloading to reduce unnecessary power, data consumption, and/or other resources on the mobile device 250 while maintaining functionalities of the applications.

In some embodiments, the application state manager 206 can determine one or more time periods for performing the offloading techniques. For example, the optimal time setting module 208 can obtain information about the mobile device's operation including, for example, network usage, battery, CPU, memory and/or other resources. The information can be provided to the optimal time setting module 208 via, for example, the device state monitor 121 described in relation to FIG. 1E. In some embodiments, the optimal time setting module 208 can receive instructions regarding the offloading time period(s) from a user, the application developer, the carrier or network operator, the device manufacturer, or the like. Some instructions may be given priority over others and may be received from either one or more input mechanisms on the device 250 or from the network 117 (FIG. 1A). Examples of these offloading time periods include off-peak or late night hours (e.g., from 10:00 PM to 6:00 AM) or during a time period in which low user activity or low battery power is detected. In some embodiments, the application state manager 206 can detect operation of a data intensive application on the mobile device and trigger the optimal time setting module 208 to offload operation of other mobile applications on the mobile device to a remote server. The offloading in this instance allows the mobile device to allocate more resources to the data intensive application that the user is interacting with and as a result, improves the user experience.

The optimal time setting module 208, in determining the time period(s), can employ one or more suitable heuristics or algorithms, and can receive aids from a resource usage pattern detector 212 or other suitable tools. The resource usage pattern detector 212 can detect patterns of usage of resources such as CPU, memory, battery, network, or the like by applications. For example, one pattern that the resource usage pattern detector 212 can detect can be consumption of a large amount of network resource by an application 210A between 10 pm and 6 am. In some embodiments, the user can instruct the application state manager 206 in selecting which one or more of the applications (e.g., applications 210A-N) should be offloaded according to the techniques disclosed herein.

According to the determined, user specified, operator specified, carrier/network operator specified time period, or conditions which warrant for example, partial application function/feature offloading, the application state manager 206 can suspend one or more select applications on the mobile device 250 so that the suspended applications become dormant or go into hibernation. When a suspended application goes into hibernation, the typical computing power and other resources consumption associated with that application on the device can be reduced or, in some embodiments, substantially or totally removed.

Upon the suspension of the application, the transfer manager 214 can initiate a transfer of functions and/or operation data of the suspended application to a remote virtual machine (e.g., RVM 113A, FIG. 1A) to establish an application copy (e.g., application copy 115A, FIG. 1A) operating on the remote virtual machine as a surrogate of the suspended application on the device 250. The remote virtual machine in the cloud-based environment is located on a remote server (e.g., server 111, FIG. 1A) that is separated from the mobile device. In some embodiments, the remote virtual machine uniquely corresponds to the mobile device 250 and is able to emulate the computer architecture, specifications, and functions of the mobile device 250 (e.g., emulating the mobile device hardware and its operating system environment, as well as other configuration and/or preferences). Specifically, the application synchronization module 216 in the transfer manager 214 manages the transfer and/or receipt of any data that is necessary or relevant to the normal operations of the suspended application to ensure the timeliness, accuracy and/or consistency of the data.

The remote virtual machine can execute the application copy in a same or similar way as how the mobile device 250 executes the original application. Also, the application copy operating on the remote virtual machine can communicate to one or more third-party servers (e.g., third-party servers 119A-N, FIG. 1A) in a same or similar way as how the original application on the mobile device 250 communicates to the third-party servers. In this way, the application copy continues to normally operate in the remote virtual machine and communicate with the third-party servers (e.g., via network 117), even when the application's operation is suspended on the mobile device 250. In those embodiments which the third-party servers (e.g., third-party server 119A-N) comprise the remote virtual machines, the application copy can communicate directly with the third-party servers.

Upon the expiration of the offloading time period, the data generated during the application copy's operations on the remote virtual machine are transferred back to the mobile device 250. The transfer back process can be initiated by the mobile device 250 (e.g., via the transfer manager 214), by the server hosting the remote virtual machines, or by any other suitable entity such as an administrator or a policy maker associated with the server. The transfer manager 214 receives the data from the server, and the application synchronization module 216 updates any changes from the received data to the suspended application on the device 250.

In some embodiments, the application operation data (e.g., application ID, bundle ID, version number, user credentials, settings/preferences, and so forth) that are necessary to set up and configure a corresponding application copy on a remote virtual machine can be transferred from the mobile device 250 to the server 111. Additionally or alternatively, application functions (e.g., receiving a certain type of push notifications, and/or polling third-party servers for a certain type of updates) can be transferred from the mobile device 250 to the server 111.

In other embodiments, the application's functions and/or operation data can be transferred once during an initial offloading session, and any subsequent change (e.g., configuration, credential, and/or other suitable attributes) can be transferred in subsequent offloading sessions. In yet other embodiments, the application's functions and/or operation data can be transferred at each or one or more select offloading sessions.

It is also noted that, in some embodiments, it is not necessary to transfer the application's functions and/or operation data from the server 111 back to the mobile device 250 after the offloading session(s) is over. In these embodiments, only the updates/changes to those operation data are transferred back.

After the update, the application state manager 206 resumes the normal operations of the previously suspended application 210A on the mobile device 250. It is noted that the functionalities of various elements or components described in the application offload engine 205 and/or remote virtual machine are merely exemplary, as they may be logically and/or physically distributed across multiple components or be grouped into several components. For example, as previously discussed, embodiments shown in FIGS. 1E-1F illustrates how the application offload engine 205 and/or remote virtual machines can be implemented within a distributed-proxy system.

In some embodiments, the transfer to and from the server hosting the remote virtual machines is encrypted and secured by one or more suitable encryption algorithms. In some embodiments, the user or the administrator of the mobile device 250 can control and access the remote virtual machine. Also, in some embodiments, when the data and/or functions of a suspended application are transferred from the mobile device to the server (e.g., server 111) and when the data or updates to the data are transferred back from the server (e.g., server 111) to the mobile device 250, one or more data compression techniques (e.g., loss less compression, lossy less compression) can be applied to further reduce data and/or power consumption.

In this way, among other benefits, the offloading techniques disclosed herein bring the benefit of resource savings from suspending the application on the mobile device while maintaining normal operations of the suspended application without any loss of data.

Figure 3A:
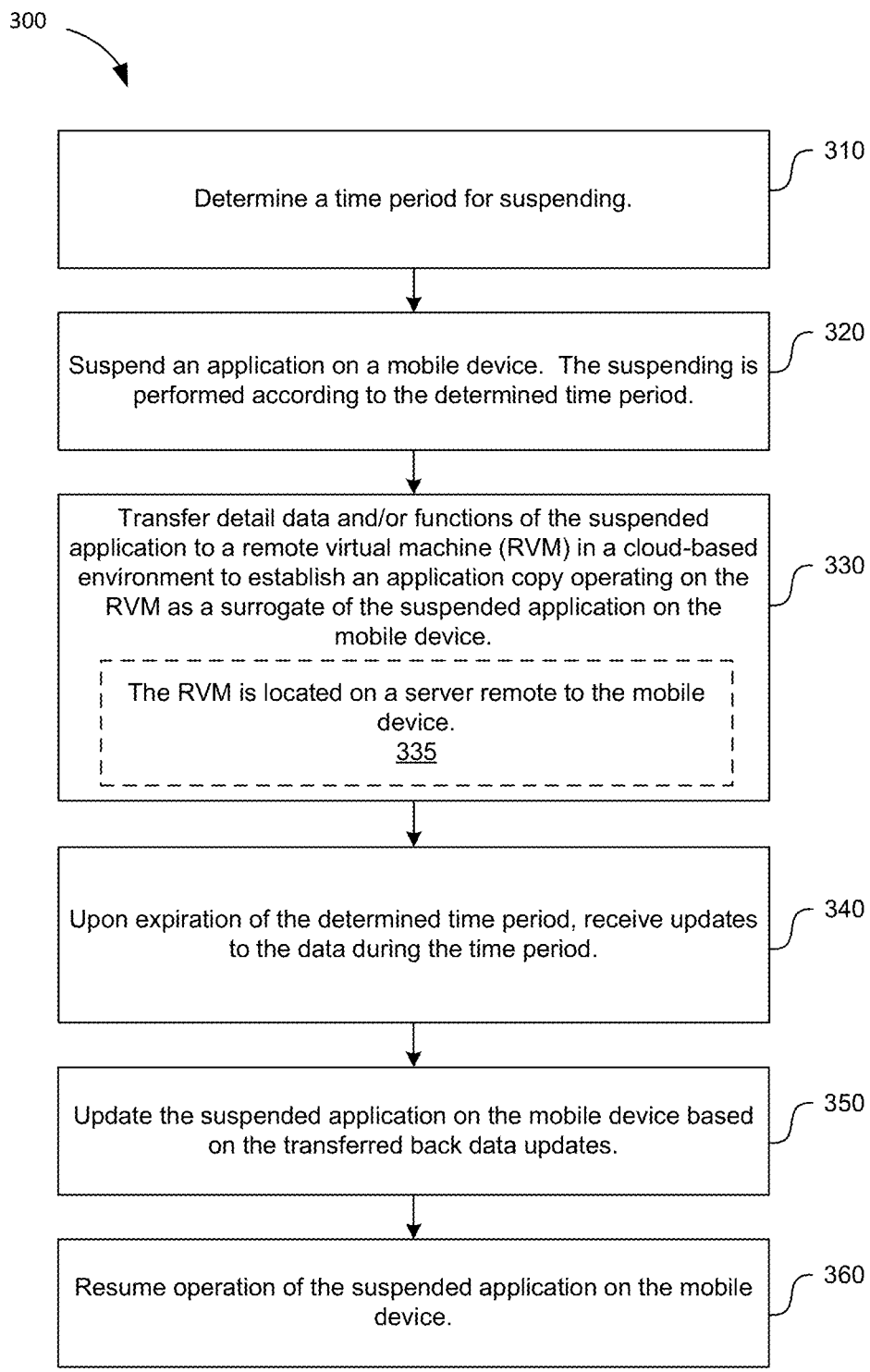
FIG. 3A depicts an example flow diagram illustrating a method of mobile application function and/or operation data offloading.

FIG. 3A depicts an example flow diagram illustrating a method 300A of mobile application offloading. The method 300A can be implemented on, for example, a user mobile device (e.g., mobile device 150, FIG. 1A-1L, device 250, FIG. 2). With general reference to FIGS. 1A-1B and 2-3, the method 300A is now described.

First, at block 310, a time setting module (e.g., optimal time setting module 208, FIG. 2) of an application offload engine (e.g., application offload engine 205, FIG. 2) on a mobile device 250 determines a time period (e.g., at optimal times such as night time, user configured times or inactive times) for suspending operation or functioning of an application (e.g., any application 210A-N, FIG. 2) on the mobile device 250. The optimal time setting module 208 can determine the time period(s) based system information about the device 250, instructions from the user, network carrier/operator, instructions from an administrator, other suitable data, or a combination thereof.

According to the determined time period, at block 320, an application state manager (e.g., application state manager 206, FIG. 2) of the application offload engine 205 suspends an application on the mobile device 250. When the application is suspended, the typical computing power and other resources consumption associated with operating the application on the device 250 can be greatly reduced or, in some embodiments, totally removed.

Approximately upon the suspension of the application, at block 330, a transfer manager (e.g., manager 214) of the application offload engine 205 transfers operation data and/or functions of the suspended application to a remote virtual machine (e.g., virtual machine 113A, FIG. 1A) to establish an application copy (e.g., application copy 115A, FIG. 1A) operating on the virtual machine as a surrogate of the suspended application on the mobile device 250. In some embodiments, data associated with the suspended application are transferred to the remote virtual machine. Additionally or alternatively, functions associated with the suspended application can also be transferred. In some other embodiments, a duplicate software copy of the suspended application can be transferred.

The virtual machine, for example, of the cloud-based environment can be hosted or located (335) on a remote server (e.g., server 111) that is remote to the mobile device 250. In some embodiments, the remote server can be a part of a host server that hosts other conservation functions (host server 100, FIG. 1B). In some other embodiments, the remote server can be hosted by or can be a part of a third-party server (e.g., third-party server 119A, FIG. 1A; server 110, FIG. 1B).

Upon expiration of the determined time period, at block 340, the transfer manager 214 receives (e.g., manager 214, FIG. 2) updates to the data received or generated during the time period when the application copy was being executed on the remote virtual machine. In some embodiments, only the relevant updates/changes are transferred back. In other embodiments, all data can be transferred back. The transfer can be initiated by the mobile device 250 (e.g., via the transfer manager 214) or by the server 111 or by other suitable entities.

After receiving the data or the updates/changes to the data, an application synchronization module (e.g., application synchronization module 216, FIG. 2) updates the suspended application on the mobile device 250 based on the received data at block 350. The application state manager 206 then resumes operation of the suspended application on the mobile device 250 at block 360.

Figure 3B:
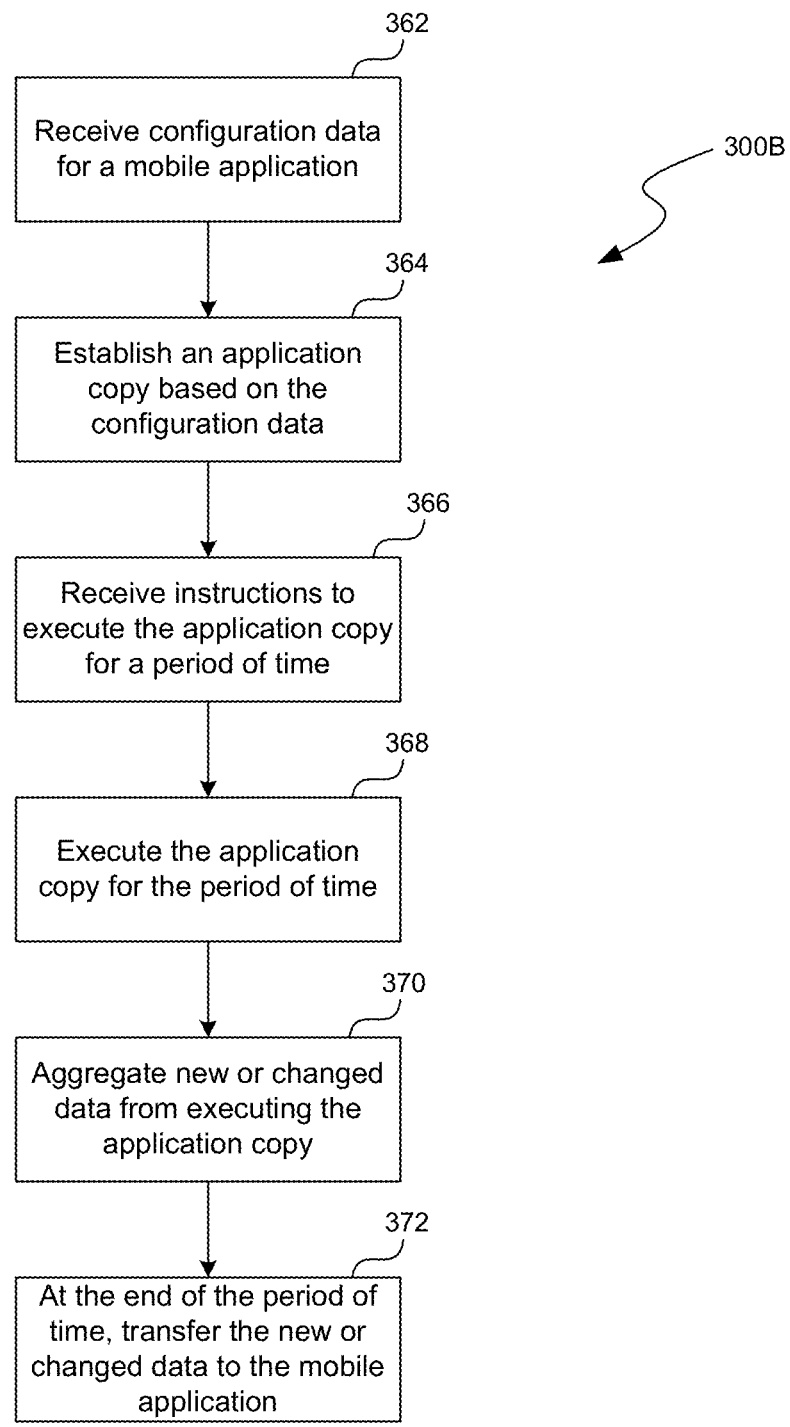
FIG. 3B depicts an example flow diagram illustrating a method of executing a copy of a mobile application at a virtual machine.

FIG. 3B depicts an example flow diagram illustrating a method 300B of executing an application copy of a mobile application. The method starts at block 362, when a virtual machine on a server or a server cloud receives configuration data to establish a copy of a mobile application installed on a mobile device. At block 364, the virtual machine establishes a copy of the mobile application based on the configuration data. At block 366, the virtual machine receives instructions to execute the application copy for a period of time and in response to receiving the instructions, executes the copy of the mobile application for the period of time in the same manner as the mobile device would execute the mobile application at block 368. The period of time can be included in the instructions and can be determined based on user behavior, user settings or a state of the mobile application.

At block 370, the virtual machine aggregates new or changed data from executing the copy of the mobile application and at the end of the period of time, transfers the new or changed data that are aggregated to the mobile application on the mobile device at block 372.

While the copy of the mobile application is being executed at the virtual machine, the mobile application remains in a paused or suspended state to reduce consumption of resources by the mobile application on the mobile device. In the paused or suspended, the mobile application consumes limited or no resources at all. When the new or changed data is transferred to the mobile application at the end of the period of time, the transferred data updates the mobile application and causes the mobile application exit the paused state and resume normal operation.

Figure 4:
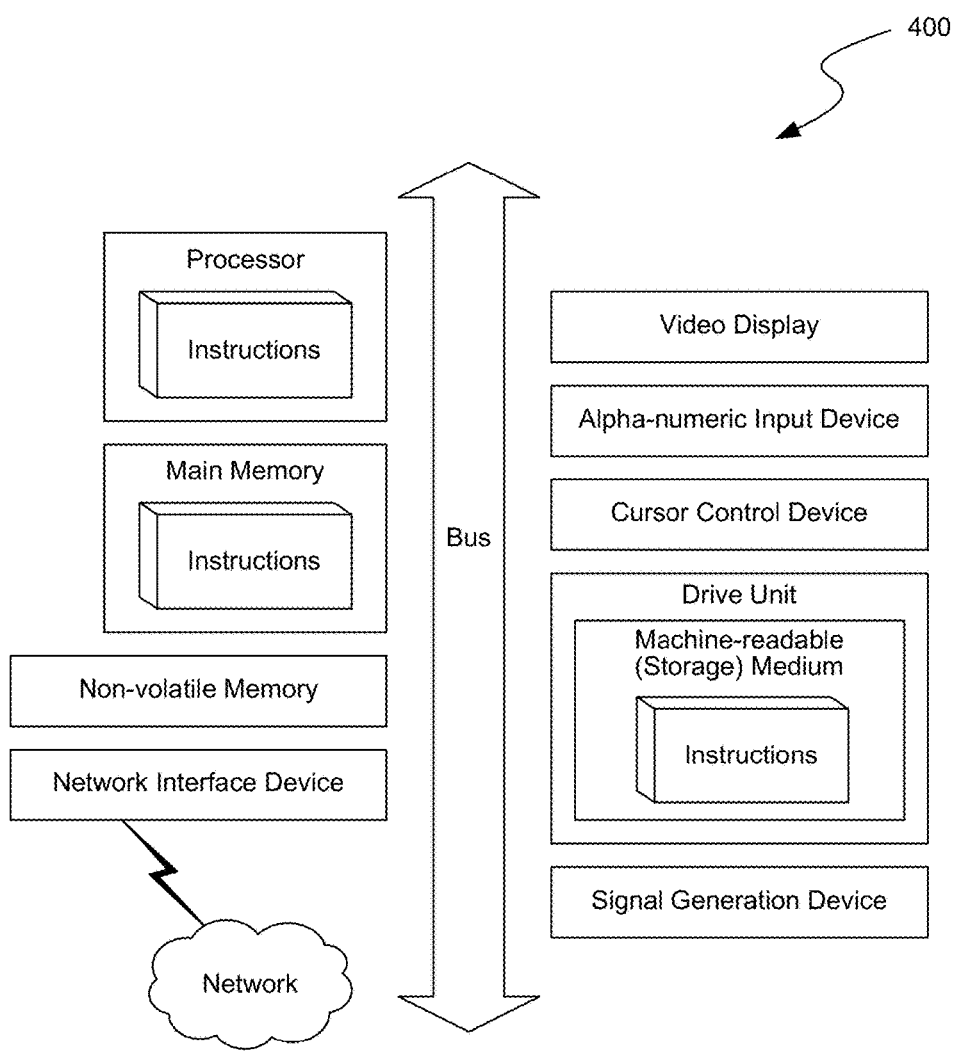
FIG. 4 depicts a diagrammatic representation of a machine in the example form of a computer system within which a set of instructions, for causing the machine to perform any one or more of the methodologies discussed herein, may be executed.

FIG. 4 shows a diagrammatic representation of a machine in the example form of a computer system within which a set of instructions, for causing the machine to perform any one or more of the methodologies discussed herein, may be executed.

In the example of FIG. 4, the computer system 400 includes a processor, memory, non-volatile memory, and an interface device. Various common components (e.g., cache memory) are omitted for illustrative simplicity. The computer system 400 is intended to illustrate a hardware device on which any of the components depicted in the example of FIG. 2 (and any other components described in this specification) and the methods 300A and 300B depicted in FIGS. 3A and 3B can be implemented. The computer system 400 can be of any applicable known or convenient type. The components of the computer system 400 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 400. The non-volatile storage can be local, remote, or distributed. The non-volatile memory is optional because systems can be created with all applicable data available in memory. A typical computer system usually includes at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 400 can be controlled by operating system software that includes a file management system, such as a disk operating system. One example of operating system software with associated file management system software is the family of operating systems known as Windows®. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claim intended to be treated under 35 U.S.C. §112, ¶6 begins with the words "means for".) Accordingly, the applicant reserves the right to add additional claims after filing the application to pursue such additional claim forms for other aspects of the disclosure.

What is claimed is:

1. A method of offloading operations of a mobile application, comprising:
    establishing an application copy of a mobile application installed on a mobile device at a remote virtual machine;
    suspending the mobile application on the mobile device; and
    tracking resource consumption by a plurality of mobile applications on the mobile device;
    selecting the mobile application for offloading based on the resource consumption that is tracked;
    determining a period of time during which the operations of the mobile application are offloaded to the application copy at the remote virtual machine based on context awareness, wherein context awareness includes network-side contextual data and client-side contextual data, wherein the client-side contextual data includes user activity patterns;
    wherein the selected mobile application is offloaded during a time period in which no user activity is detected; and
    offloading operations of the mobile application to the application copy at the remote virtual machine for the period of time.

2. The method of claim 1, wherein suspending the mobile application and offloading the operations of the mobile application to the remote virtual machine for the period of time reduces consumption of resources by the mobile application on the mobile device.

3. The method of claim 2, wherein offloading the operations of the mobile application to the application copy at the remote virtual machine for the period of time reduces consumption of at least two of power, data, memory or CPU resources by the mobile application on the mobile device.

4. The method of claim 1, further comprising:
    receiving data generated or obtained by the application copy during the period of time the operations of the mobile application was offloaded to the application copy; and
    updating the mobile application with the received data.

5. The method of claim 4, further comprising:
    resuming the mobile application on the mobile device upon updating the mobile application with the received data, wherein the received data includes new or changed data.

6. The method of claim 4, wherein the received data including new or changed data for updating the mobile application and data that is transferred to the remote virtual machine to establish the application copy are compressed to reduce network bandwidth consumption.

7. The method of claim 1, further comprising:
    determining the period of time during which the operations of the mobile application are offloaded to the application copy at the remote virtual machine based on at least one of: user instructions or a state of the mobile application.

8. The method of claim 1, further comprising:
    selecting the mobile application from a plurality of mobile applications on the mobile device for offloading based on user instructions.

9. The method of claim 1, wherein establishing the application copy of the mobile application on the mobile device at the remote virtual machine includes transferring application data associated with the mobile application to the remote virtual machine to facilitate the application copy to be executed on the remote virtual machine in the same manner the mobile application would be executed on the mobile device.

10. The method of claim 1, wherein the application copy is executed at the remote virtual machine to perform the operations of the mobile application, wherein the operations include communicating with an application server associated with the mobile application to obtain new or changed data.

11. The method of claim 1, wherein multiple mobile applications on the mobile device have application copies established at a server hosting multiple remote virtual machines including the remote virtual machine.

12. The method of claim 1, wherein user activity is received though one or more signals via one or more input mechanisms, and wherein user activity includes one or more of: user keystrokes, backlight status, mobile application operating state, application type, application behavior, and application activity.

13. The method of claim 1, wherein network side contextual data includes network information received from and/or queried from network service providers including network capacity, bandwidth, traffic, type of network/connectivity, or operational state data.

14. A mobile device, comprising:
    a memory;
    a processor disposed in communication with the memory and configured to execute a plurality of instructions stored in the memory to:
        transfer configuration data corresponding to a mobile application on the mobile device to a remote server to establish a proxy of the mobile application on a virtual machine hosted by the remote server;
        suspend the mobile application on the mobile device;
        track resource consumption by a plurality of mobile applications on the mobile device;
        select the mobile application for offloading based on the resource consumption that is tracked;
        determine a period of time during which the operations of the mobile application are offloaded to the application copy at the remote virtual machine based on context awareness, wherein context awareness includes network-side contextual data and client-side contextual data, wherein the client-side contextual data includes user activity patterns,
 wherein the selected mobile application is offloaded during a time period in which no user activity is detected; and
 offload operations of the mobile application to the proxy of the mobile application at the virtual machine for the period of time.

15. The mobile device of claim 14, wherein timing for suspending the mobile application and offloading operations of the mobile application is determined based on user instructions, availability of resources on the mobile device, state of the mobile application or a combination thereof.

16. The mobile device of claim 14, further configured to:
 receive application data corresponding to the operations of the mobile application performed by the proxy of the mobile application from the virtual machine;
 update the mobile application on the mobile device using the received application data; and
 resume the mobile application following the update.

17. A system, comprising:
 a remote server hosting a virtual machine configured to:
  track resource consumption by a plurality of mobile applications on a mobile device;
  select the mobile application for offloading based on the resource consumption that is tracked;
  receive configuration data to establish a copy of the mobile application selected for offloading installed on a mobile device;
  determine a period of time during which the operations of the mobile application are offloaded to the application copy at the remote virtual machine based on context awareness, wherein context awareness includes network-side contextual data and client-side contextual data, wherein the client-side contextual data includes user activity patterns;
  wherein the selected mobile application is offloaded during a time period in which no user activity is detected;
  in response to receiving instructions, execute the copy of the mobile application for the period of time in the same manner as the mobile device would execute the mobile application;
  aggregate new or changed data from executing the copy of the mobile application; and
  at the end of the period of time, transfer the new or changed data that are aggregated to the mobile application on the mobile device.

18. The system of claim 17, wherein the mobile application remains in a paused state during the period of time to reduce consumption of resources by the mobile application on the mobile device.

19. The system of claim 18, wherein the new or changed data that is transferred to the mobile application at the end of the period of time updates the mobile application and causes the mobile application to exit the paused state and resume normal operation.

20. The system of claim 17, wherein the virtual machine is one of multiple virtual machines hosted by the remote server, the multiple virtual machines configured to execute copies of mobile applications installed on multiple mobile devices.

21. The system of claim 17, wherein the period of time is included in the instructions and is further determined based user settings or a state of the mobile application.

* * * * *